April 27, 1965 P. MOSKOPF ETAL 3,180,506
MECHANICAL GRABS

Filed April 25, 1962 3 Sheets-Sheet 1

United States Patent Office 3,180,506
Patented Apr. 27, 1965

3,180,506
MECHANICAL GRABS
Peter Moskopf, Hermannstrasse 21; Heinrich Boden, Reckstrasse; and Heinrich Mengden, Runkelstrasse 5, all of Neuwied (Rhine), Germany
Filed Apr. 25, 1962, Ser. No. 190,136
2 Claims. (Cl. 214—310)

This invention relates to mechanical grabs, and particularly to a device for picking up and transporting flat or horizontal loads resting on a flat base or carrier, such as newly cast concrete slabs lying on a pallet or the like.

When picking up flat or horizontal loads which normally rest on the flat surface of a pallet or the like it sometimes happens that in additon to the actual article to be lifted a base or pallet or the like must be picked up as well, and must be carried over considerable distances. This is especially liable to occur at works where concrete slabs or the like are made, and may also occur in tile factories or other plants making coarse ceramic articles.

Heretofore it has been customary to grip the article to be lifted with one mechanical grab, the base or pallet by its own weight resting on its place, and then to grip said base or pallet by means of a second mechanical grab or the like. Both items by means of their independent grab mechanisms were transported, then, to the desired places, respectively.

When extremely lightweight bases or pallets or the like were used to support the slabs or the like prior to their gripping by said first gram mechanism it happened that the base or pallet stuck to the slab for an unpredictable time. When the grab mechanism was lifted together with the slabs, the pallet members went up therewith and under the action of their own weight fell down at some unpredictable place in the way of the grab mechanism transporting the slabs, which obviously is undesirable.

Accordingly, it is an object of the invention to provide a mechanical grab for lifting relatively flat loads resting on a flat base or carrier, for example a pallet or the like, in which the difficulties of the prior art devices are overcome.

Particularly it is an object of the invention to provide in a mechanical grab for handling loads which may be sensitive to pressure, means extending along at least one side of the load gripping elements for engaging and retaining the base or pallet supporting said load, and mechanisms operated independently of the load gripping elements for releasing and deposing said base or pallet.

With a mechanical grab provided with such means it is possible to grip and handle the load and the base supporting same independently of each other, so that neither a second grab mechanism is required to transport the base member, nor is there any more danger that the base member falls down at some undesirable place.

According to the main aspect of the invention, a mechanical grab for handling loads comprises a pair of oppositely movable arms for gripping opposite sides of a load, and a pair of supplementary jaws embracing the load gripping arms with working clearance to permit independent engagement of the base or pallet and the load, respectively.

Further details, objects and advantages of the invention will become apparent from a perusal of the following description of one exemplary embodiment of the invention in connection with the accompanying drawings, in which.

Figure 1:
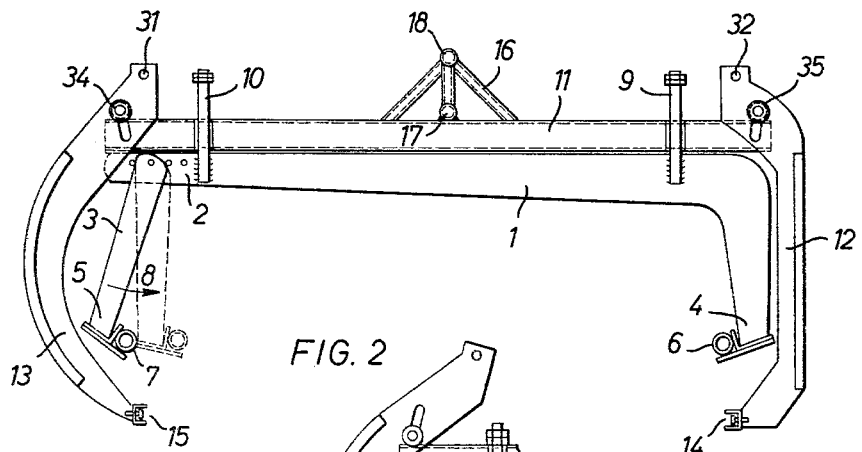
FIGURE 1 is a side elevation of a two-armed grab with stripper attached.
Figure 2:
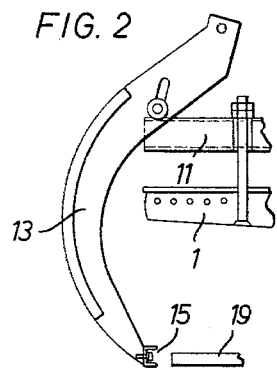
FIGURE 2 shows a detail of FIGURE 1 in a different operating position.

The design of the main grab is immaterial to the present invention, and can be varied at will, provided that it is possible suitably to attach the stripper mechanism. Suitable grab mechanisms for this purpose are shown for example in U.S. Patents 2,416,575, 2,832,629, and 2,866,660. In the following description with reference to the drawings, a type of main grab is shown similar to that shown in one of the aforementioned U.S. patents and in detail disclosed in our earlier co-pending application Ser. No. 182,572, filed March 26, 1962, now abandoned and having main load engaging or pick-up elements movable towards and away from each other and comprising a bell crank lever 1 (FIGS. 1 and 2) to the end of one limb of which is pivoted a straight adjustable arm 3 provided, as in the known mechanisms mentioned above, with a lever fixedly secured thereto and concealed behind the bell crank 1 and the carrier rail 11 explained below. At the free ends 4, 5 of the bell crank 1 and of the straight arm 3 respectively, are fixed flexible resilient members 6, 7 which grip the load—for example, fresh concrete slabs which are susceptible to pressure—when straight arm 3 is pivoted in the direction of the arrow 8 to the position shown by the dotted lines in FIGURE 1 in response to lifting the grab 1, 3 by means of the lever (not shown) fixedly secured to the arm 3, as described in detail in our co-pending application mentioned above. On the longer limb of the bell crank are two guide bolts 9, 10 which locate a rigid carrier frame or rail 11 on which the stripper described below is mounted for bodily displacement relative to the main grab arms 1, 3. The stripper consists of two supplementary gripping arms or jaws 12, 13 which work outside the main grab 1, 3 itself and have at their free ends inward-facing channels 14, 15 adapted to grip the base or pallet 19 (FIG. 2) on which the slabs to be lifted are assumed to be resting. In FIGURE 2 the bell crank lever 1 is shown spaced below the carrier rail 11, and the inturned channel 15 at the end of the supplementary jaw lies clear of the base or pallet 19, and is therefore in the "open" position. At least two such units 1, 3, 12, 13 are required for each grab, whilst if two grabs are arranged one next the other, four each units are necessary.

On the carrier rail 11 is mounted a welded tubular trestle 16 which carries the two tubes 17 and 18 for connection of the unit to a companion unit.

Figure 3:
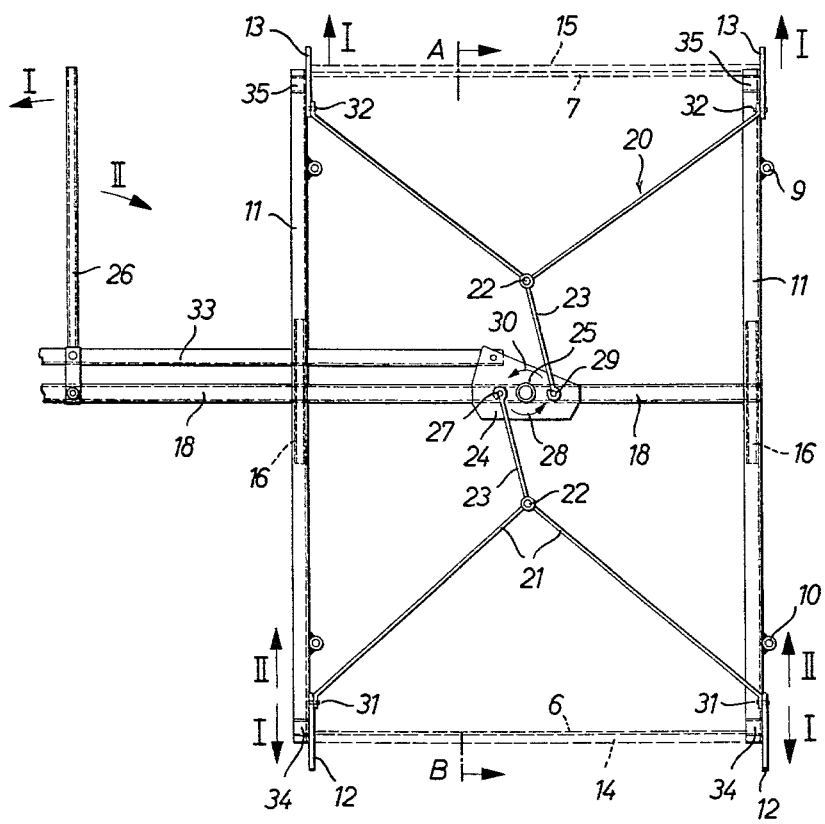
FIGURE 3 is a plan of the operating mechanism for the stripper.
Figure 4:
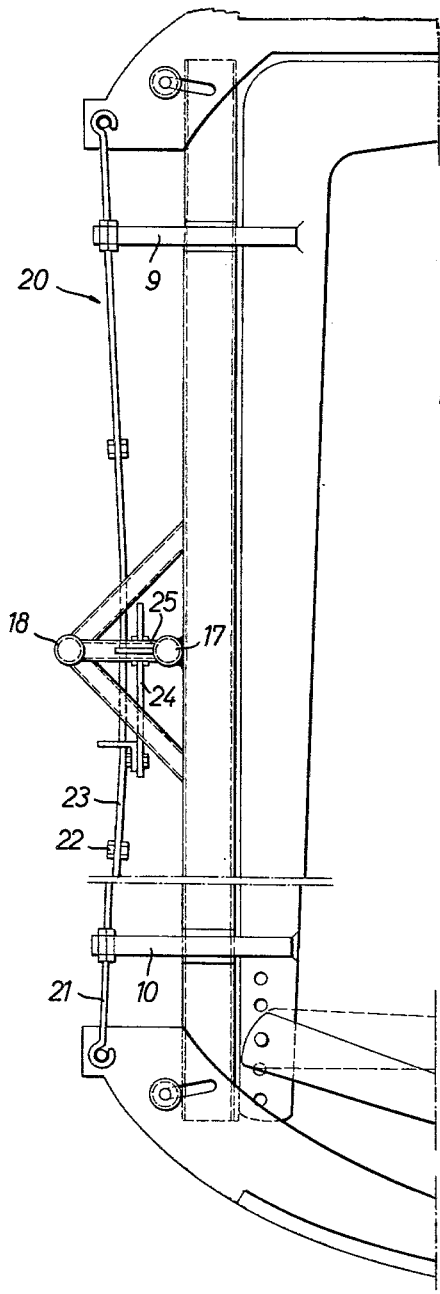
FIGURE 4 is a section on the line A—B of FIGURE 3.

Referring now to FIGURE 3, the supplementary jaws 12 and 13 are interconnected in pairs at their ends by respective pairs of yoke rods 20, 21, each pair of rods being pinned at 22 to the adjacent end of a link 23 whose other end is pivoted to a plate 24. This plate is rotatable on a pin 25 under the control of a lever 26 pivoted on an extension of tube 18 and connected to the plate by a bar 33. The lever 26 has three positions: the central position shown, and two limit positions on either side, these latter being indicated by the numerals I and II.

In position I, the pivot 27 between one link 23 and the plate 24 moves down in the figure in the direction shown by the arrow 28. In so doing this link 23 moves the yoke rods 21 down, swinging the top ends of the jaws 12 downwards as indicated by the arrows I. At the same time, the pivot 29 between the other link 23 and the plate 24 moves up in the figure, as shown by the arrow 30, so that the other link 23 pushes the yoke rods 20 up and swings the top ends of the jaws 13 upwards in the figure. The lower ends of the pairs of jaws 12, 13 are thus moved inwards (see FIG. 1) and the base or pallet 19 (see FIG. 2) is gripped, and can be transported and independently deposited if desired.

In position II, the parts move in the opposite directions so that the lower ends of the jaws 12, 13 move apart to release the pallet 19. It will be noted that the jaw 13 is curved to allow the arm 3 to swing as required for picking up or releasing the main load without interference from the stripper jaw.

The jaws 12, 13 are pivoted to the carrier rail 11 by pivots 34, 35, and are slotted at their pivot points so that, when the load is set down by the main grab pick-up arms 1, 3, the jaws 12, 13 are pushed upwards so as not to hinder the movement.

In operation, the grabs 1, 3 with the carrier rails 11 are suspended, in a manner known per se and described in detail in our co-pending application mentioned above, from a jib or the like and are lowered on a load consisting, for example of a pallet 19 (FIG. 2) and bricks or the like disposed thereon, both the grabs 1, 3 and the supplementary jaws 12, 13 being in their open position (lever 26 in position I). When the inward-facing channels 14, 15 of the supplementary jaws 12, 13 have reached the height of the pallet 19, lever 26 is moved to position II (FIG. 3) so that the channels 14, 15 grip the pallet 19 (FIG. 2). The main grab 1, 3 is further lowered until it assumes the position shown in FIG. 2. Block or nose holding the grabs 1, 3 open is then released, as described in one of the aforementioned patents or in our copending application mentioned above, and lifting the unit now causes the main grab 1, 3 to grip the load disposed on the pallet 19. The main grab 1, 3 with the load is then lifted further and engages the rail 11 whereupon said rail 11 together with the supplemental jaws 12, 13 and the pallet 19 gripped by the channels 14, 15 thereof is lifted too.

When it is desired to deposit the pallet 19, the entire apparatus is lowered just until said pallet rests on the ground or where it is to be laid down. The lever 26 is then moved into its position I (FIG. 3) so that the supplemental jaws 12, 13 open to free the pallet 19, while the main grab 1, 3 rests in its closed condition. The entire apparatus is then lifted again and moved to the location where the load, for example the bricks, are to be placed. There it is again lowered, and this time until the load rests on the ground or where it is to be placed, the main grabs 1, 3 then opening in the known manner.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. A mechanical handling device comprising a main grab having opposed main load engaging arms; supplementary jaws pivotally supported on said arms; means at the extremity of each supplementary jaw for engaging a pallet adhering to the underside of said main load; means for actuating said supplementary jaws to grip and release said pallet; and means for permitting limited bodily displacement of said supplementary jaws relative to said main load engaging arms in the direction for stripping said pallet from said main load.

2. A mechanical handling device according to claim 1 wherein said supplementary jaws are pivotally mounted on a carrier, said carrier being mounted on said main grab for bodily displacement relatively thereto.

References Cited in the file of this patent
UNITED STATES PATENTS

| | | |
|---|---|---|
| 2,323,810 | Fontaine | July 6, 1943 |
| 2,539,543 | Leuthner | Jan. 30, 1951 |
| 2,574,394 | Isler | Nov. 6, 1951 |
| 2,679,328 | Ballato | May 25, 1954 |
| 2,998,892 | Menzel | Sept. 5, 1961 |